J. W. MALLET.
Manufacture of Chloroform and Allied Products.
No. 220,397.        Patented Oct. 7, 1879.
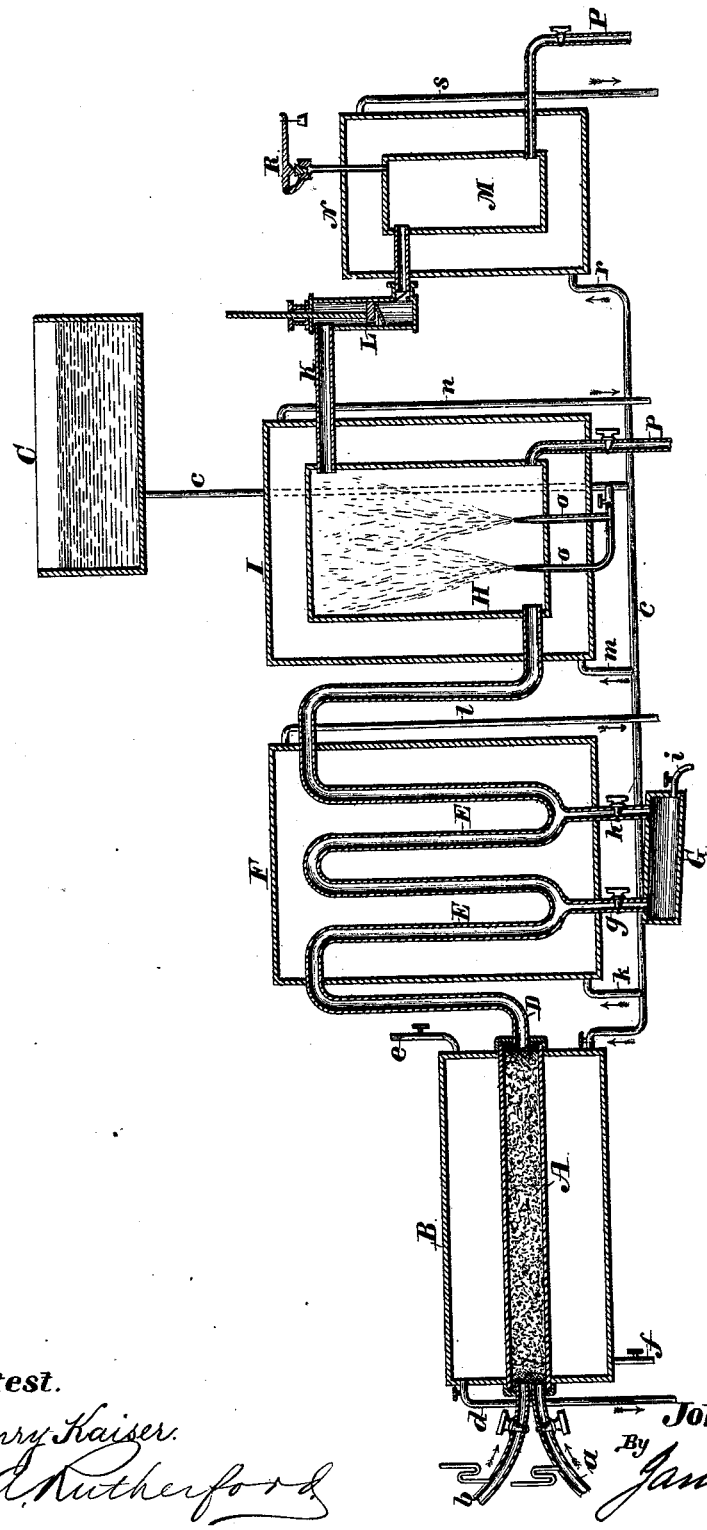

UNITED STATES PATENT OFFICE.

JOHN W. MALLET, OF UNIVERSITY OF VIRGINIA, VIRGINIA.

IMPROVEMENT IN THE MANUFACTURE OF CHLOROFORM AND ALLIED PRODUCTS.

Specification forming part of Letters Patent No. 220,397, dated October 7, 1879; application filed August 30, 1879.

*To all whom it may concern:*

Be it known that I, JOHN W. MALLET, of University of Virginia, in the county of Albemarle and State of Virginia, have invented certain new and useful Improvements in Processes and Apparatus for Manufacturing Chloroform and other Products from Hydrocarbons, of which the following is a specification.

My invention relates to the production of chloroform and other useful substances from gases or vapors consisting in whole or in part of hydrocarbons, such as are found naturally escaping from the earth, or are procured from the same by boring, or are prepared by the vaporization of the light portions of petroleum, by destructive distillation, or other well-known artificial means; and the object of the invention is to obtain products of the kinds referred to by the action of chlorine, applied as more fully hereinafter described.

To this end my invention consists in the process of manufacturing chloroform and other allied or analogous products from methane, ethane, and other hydrocarbons by the action of chlorine or other analogous elements upon the same, the said process consisting in passing the chlorine or other analogous element through a body of porous or other material described, or by subjecting the chlorine or other analogous element and the hydrocarbon to mutual reaction in the presence of such material at a proper temperature, as more fully hereinafter specified.

The drawing represents a vertical sectional view of the apparatus for carrying out my invention, in which the letter A indicates a chamber or vessel, of tubular or other convenient shape, and constructed of any suitable material—such as lead, stoneware, glass, or iron or other metal coated or lined with glass or enamel, or other suitable material that will not be injuriously affected by the chlorine or the products formed in said chamber. The said chamber is provided with pipes $a$ $b$, for admitting the gases, and with stop-cocks or valves, by means of which the flow of gas may be regulated. The pipes $a$ $b$ are also provided with gages, as shown, to indicate the pressure of the gas.

The letter B indicates a jacket surrounding the chamber A, and $c$ an induction or inlet pipe connected with a suitable water-supply—such as a pump or reservoir—a reservoir in the present instance being employed, as indicated by the letter C. The said jacket is also provided with an overflow-pipe, $d$, for the escape of water, an inlet-pipe, $e$, for the admission of steam or hot water, and an eduction-pipe, $f$, for the escape of steam or hot water, the pipes being provided with stop-cocks, by means of which the circulation of water or steam through the jacket can be provided for at will.

The letter D indicates an eduction or outlet pipe extending into a chamber, F, where it forms a series of return-bends, E, after which it passes out and connects with another vessel, as more fully hereinafter described. From the lower part of the return-bends E extend the pipes $g$ $h$, which are provided with suitable stop-cocks or valves, the lower ends of said pipes connecting with a receiving-reservoir, G, into which the condensed products may be drawn off. Said reservoir is provided with a cock, $i$, by means of which the contents may be withdrawn when desired.

The vessel F is connected, by means of a branch pipe, $k$, with the pipe $c$, and is provided with an eduction-pipe, $l$, by means of which a current of water may be caused to circulate through the vessel F, in order to effect the condensation of the products in the return-bends E. This water may, if necessary, be cooled by ice or any other means.

The letter H indicates the chamber with which the continuation of the pipe D and return-bends E connects, entering the same at or near its bottom. Said chamber H is inclosed in a water-jacket, I, which is connected by a branch pipe, $m$, with the water-supply pipe $c$, and is provided with an eduction-pipe, $n$, to cause a thorough circulation of water through said jacket.

The chamber H has extending into it one or more pipes, $o$, branching from the water-supply pipe $c$, by means of which cold water may be injected, in the form of a spray or jet, directly into the gaseous products in the chamber. The chamber is also provided with an eduction-pipe, p, having a suitable stop-cock, by means of which the water and condensed and absorbed products may be withdrawn at convenience.

From the upper part of the chamber H extends a pipe, K, connected with a suitable pump, L, or other exhausting and condensing device, which communicates with a chamber, M, inclosed in a water-jacket, N, which connects, by means of a branch pipe, r, with the water-supply pipe c, and which is provided with an eduction or escape pipe, s, by means of which a current of cold water may be caused to circulate through the jacket, to assist in the condensation of the vapors in the chamber M, which are forced into said chamber under pressure by means of the pump L.

The letter P indicates a pipe leading from the lower part of the chamber, said pipe being provided with a stop-cock, in order to draw off the products condensed in said chamber. The chamber M is provided with a safety-valve, R, by means of which undue pressure from the accumulation of uncondensed gases in said chamber may be prevented.

It will be evident that the various portions of the apparatus which are exposed to the action of the gaseous products must be constructed of suitable material that will not be injuriously affected by the corrosive action of said products.

The operation of my invention is as follows: A current of the hydrocarbon gases or vapors is obtained either by direct communication by pipes or other suitable channels with natural gas-wells or petroleum-wells, or such gas-wells or petroleum-wells as have been established by artificial borings, or by like communications with holders or reservoirs in which the gaseous or vaporous hydrocarbons may have been stored, or by like communications with a still or other apparatus in which the gaseous and more easily vaporized portions of liquid hydrocarbons derived from the above sources or obtained by destructive distillation may be driven off, in this last case using such products as are driven off below a temperature of 85° centigrade. This current of hydrocarbon gases or vapors, either in a pure state or more or less mixed with such other non-injurious gases as are liable to occur along with them, is passed, at a rate which may be regulated by means of the stop-cock or valve in the pipe a, into the chamber A, which is charged with porous material, and there to come in contact with a current of chlorine gas, which is passed into said chamber in regulated quantities through the pipe b, the temperature of the chamber being regulated by any heating or cooling medium, which may be caused to circulate through the jacket B, or may be applied in any other convenient manner.

As regards the temperature to be maintained in the chamber A, which temperature tends in itself to rise in consequence of the chemical action set up, favorable results may be obtained between 30° and 90° centigrade; but I do not confine myself to these limits, or any other precise point between them, since the proper temperature will vary with the character of the gaseous or vaporous mixture used, and with the relative proportions in which it is desired that the respective products from the reaction shall be obtained.

The porous material with which the chamber A is charged may be of any kind capable of resisting the chemical action of the chlorine and the temperatures required, the essential feature being the possession of adequate porosity, and consequent extension of surface.

Carbon in one of its forms resulting from destructive distillation—such as animal charcoal, washed or not with acid—may be used with advantage, and is preferable; but any other porous material having substantially the characters described may be substituted therefor.

Instead of chlorine, bromine may be used, as above described, for the production of analogous results, but not at present with commercial advantage, owing to its greater cost; and instead of passing a mixture of hydrocarbon gases or vapors with chlorine through a mass of porous material, such mixture may be passed through or over either antimony trichloride, antimony pentachloride, or the chloride or chlorides of any other substance capable of easily changing its degree of chlorination, leading to the formation of a similar series of products, to be dealt with as hereinafter described, such chloride or chlorides serving the purpose merely, as does the porous material above referred to, of bringing about the chemical reactions between the gaseous chlorine and the hydrocarbon gases and vapors.

The gases and vapors escaping from the outlet D of the chamber A pass into the tubes E, which are subjected to the action of a current of cold water in the vessel F, and the gases or vapors are partially condensed in the form of chloroform, dichlormethane, carbon-tetrachloride, and small quantities of other chlorine substitution products, which will collect in the lower part of the pipes E, and can be drawn off for use, as required, through the pipes g h i. The remaining gaseous or vaporous products pass onward into the chamber H, where they are again cooled by means of a current of water passing through the jacket I, and at the same time subjected to the direct action of water, which is preferably introduced in the form of spray or jet, although it may be otherwise applied.

By this means the hydrochloric acid, which is produced in large quantities in the first stage of the process, is absorbed by the water along with small quantities of methyl-chloride and other products, which may be drawn off for use by means of the pipe p. The still remaining gases and vapors then pass on through the pipe K to the pump L or other exhausting and condensing device, and are by said pump or other device forced into the chamber M and condensed therein, the condensation being assisted by the cold applied on the outside of the vessel by the circulating current of cold water in the jacket N.

The final condensation will effect the reduction to a liquid form of methyl-chloride, ethyl-chloride, and smaller quantities of other products, which will collect in the vessel M, and may be removed by means of the pipe P for use. The uncondensed gases finally pass off through the safety-valve R.

The first products condensed by cold alone may be separated from each other, and so purified by the well-known process of fractional distillation, with or without contact with strong sulphuric acid, yielding separately chloroform, dichlormethane, carbon-tetra-chloride, and other substances valuable as anæsthetics, solvents, and for other purposes. The second products condensed by the solvent action of water may also be fractionally distilled, but are chiefly valuable as saving, in the shape of hydrochloric acid, a large proportion of the chlorine used, which acid may be used in the preparation or regeneration of chlorine itself.

The crude products condensed under pressure, with or without the application of cold at the final stage of the process, may be fractionally distilled in closed vessels under pressure greater than that of the ordinary atmosphere, so as to yield as the principal purified products methyl-chloride and ethyl-chloride, valuable in the manufacture of artificial dyes, and for the production of artificial cold in ice-machines and other refrigerating apparatus. The methyl-chloride and ethyl-chloride may be also subjected to the action of caustic alkalies, slaked lime, or other equivalent chemically basic material, and then distilled, thus affording a residuum in the still containing the chloride of the metal whose base or hydrate is employed, and a distillate consisting of methyl-alcohol and ethyl-alcohol, respectively.

Other apparatus than that hereinbefore described may be employed in carrying my improved process into effect, and hence I do not limit myself to the apparatus as described, and one or more of the decomposing-chambers, as well as the condensing-chambers, may be used, and any form of a condenser applicable to the purpose may be substituted for the condensing pipes and chambers and the cooling-jackets without departing from the spirit of my invention.

What I claim is—

The process of manufacturing chloroform and other allied or analogous products from methane, ethane, or other hydrocarbons by the action of chlorine or other analogous element upon the same, the said process consisting in passing the chlorine or other analogous element through a body of porous or other material described, or by subjecting the chlorine or other analogous element and the hydrocarbon to mutual reaction in the presence of such porous material, substantially as specified.

In testimony that I claim the foregoing I have hereunto set my hand in the presence of the subscribing witnesses.

J. W. MALLET.

Witnesses:
JAMES L. NORRIS,
JAMES A. RUTHERFORD.